UNITED STATES PATENT OFFICE.

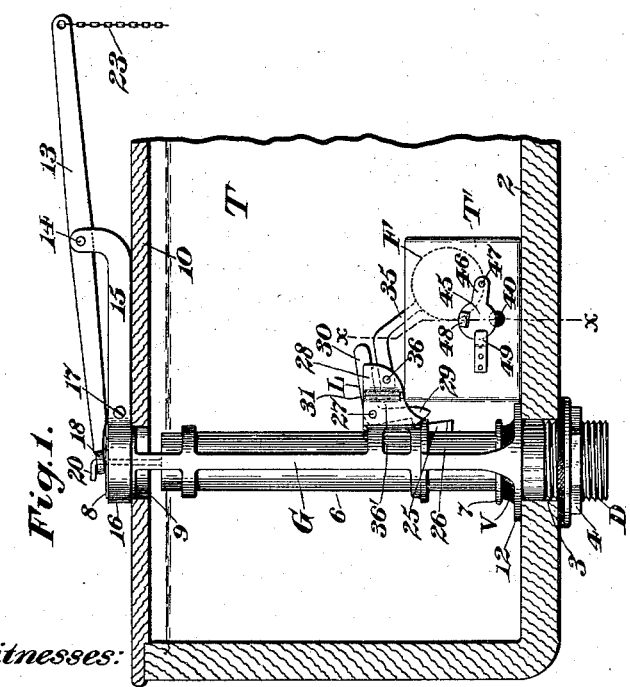

CHARLES G. MILLER, OF HARTFORD, CONNECTICUT; ETTA C. FARNAM ADMINISTRATRIX OF SAID MILLER, DECEASED.

TANK-VALVE-CONTROLLING MEANS.

SPECIFICATION forming part of Letters Patent No. 611,435, dated September 27, 1898.

Application filed August 9, 1897. Serial No. 647,537. (No model.)

*To all whom it may concern:*

Be it known that I, CHARLES G. MILLER, a citizen of the United States, residing at Hartford, in the county of Hartford and State of Connecticut, have invented certain new and useful Improvements in Tank-Valve-Controlling Means, of which the following is a specification.

This invention relates to improvements in tank-valves, and more especially to an appurtenance for use in conjunction therewith, the coöperating parts being so constructed and organized that the complete emptying of the tank is assured, whereby the incoming water, which enters the tank at a high pressure, can flood or cleanse the floor of said tank to such an extent as to prevent the accumulation of sediment or scum on the floor, which in time would seriously interfere with the action of the valve mechanism, the advantage specified being attained by locking or holding the discharge-governing valve in its open position by float-controlled means for a comparatively long period of time, and the body of water in the tank on the opening of the valve rapidly and suddenly leaves said tank for washing out a water-closet or other bowl.

My improved device consists, preferably, of a main tank and an auxiliary tank inclosed within the same, a discharge-governing valve of ordinary construction, a locker or trigger for locking the valve in its open position, and float-operated means for controlling or regulating the action of the locker or trigger.

In the form of the invention represented the auxiliary tank, to which reference has been made, rests upon the floor or bottom of the main tank and has an outlet of reduced size relatively to the discharge-outlet of the main tank, and it also contains the float for regulating the action of the valve-locker.

On the inflow of water to the main tank, the discharge-valve being closed, the trigger-regulating float will rise with the water until it reaches a position to release the locker, whereby its further ascent is intercepted by a suitable stop, thereby to permit the locker to assume its working position, so that when the discharge-governing valve is elevated the locker or trigger can act to block or arrest the immediate return of said valve and until the main tank is empty.

The rate of discharge of the main tank, as is usual, exceeding the supply, the level of the outflowing water in the main tank will descend to a point substantially in line with the outlet or efflux port in the auxiliary tank before the water in the tank can escape to any appreciable extent, and so long as this relation exists the float in the auxiliary tank will be maintained in its highest position. When, however, the water reaches a point slightly below the outlet of the auxiliary tank, the latter can slowly empty to permit the float to drop, thereby effecting the release of the locker or trigger, and consequently the valve, the locker consisting, preferably, of a gravity device, so that its quick action is assured. At about the time the level of the water in the main tank reaches a line slightly below the discharge-outlet of the auxiliary tank the float or other device controlling the supply-governing valve can drop to open the latter and permit the supply to enter the main tank, whereby the inflowing water will thoroughly cleanse the floor or bottom of the tank.

In the drawings accompanying and forming part of this specification, Figure 1 is a fragmentary view in section of a water-tank containing my improvements, the valve being closed. Fig. 2 is a similar view, the valve being open. Fig. 3 is a plan view of the trigger-operating float, its tank, and adjacent parts. Fig. 4 is a fragmentary face view as seen from the right in Fig. 1, partially in section, taken in the line $x\ x$ of said figure; and Figs. 5 and 6 are details of the valve and its stem.

Similar characters designate like parts in all the figures of the drawings.

My present invention comprehends as a part thereof a main and an auxiliary tank, (designated by T and T', respectively,) the auxiliary tank T' being of small size and contents relatively to and resting upon the floor or bottom 2 of the main tank, and held in such position in some convenient manner, as will hereinafter appear.

The main tank T is of ordinary construction, and it is furnished with the usual supply and discharge pipes, the supply-pipe and its valve not being shown in the drawings.

There is illustrated at one end of the tank a section of the ordinary discharge-pipe, (designated by D,) passing through an aperture 3 in the tank-floor 2, and secured in place by the check-nut 4.

The valve is designated by V, and it is adapted to fit or close against the inclined seat 5 at the upper end of the discharge-pipe D, as indicated in Fig. 1, so that the main tank can be filled with water. The discharge-valve is preferably annular or circular in shape and surrounds the hollow or tubular stem 6 and is held in place by the peripheral flange or projection 7, near the lower end of the stem 6, as represented in Fig. 2. The valve-stem 6 is inclosed and loosely movable within the skeleton or open guide or keeper G, the cap or head 8 of which is inserted into the aperture 9 in the usual lid or cover 10, the base piece or foot 12 of the guide being secured to the floor around the upper end of the discharge-pipe D. The head 8 of the guide G serves to limit or arrest the vertical motion of the valve-stem 6, as indicated in Fig. 2.

The usual valve-operating lever is designated by 13 and is fulcrumed or pivoted, as at 14, to the support 15, having a clamp or ring portion 16 at one end embracing the head 8 of the guide and held in place against rotation by the screw 17. The valve-operating lever 13 has at its inner end the loop 18, through which the connector or link 19 extends, said part 19 having at its upper end the right-angular extension 20, against which the lever can act to raise the valve, and at its lower end an eye 21, through which the transverse pin 22 within the hollow valve-stem 6 extends. The valve-operating lever 13 is furnished at its free end with the usual pull chain or rope 23, which when drawn downward elevates the valve-stem 6, and consequently the valve V, to carry the latter away from its seat. When the valve V, by the manipulation of the lever 13, is elevated or moved away from its seat, as represented in Fig. 2, it is locked against immediate retraction by a locker of suitable character until the water in the main tank T has nearly reached the floor to accomplish the hereinbefore-specified advantage, and the valve-guide G serves as a suitable carrier for the valve-locker.

The valve-stem 6 is provided adjacent to its lower end with the shoulder or lug 25, the outer face 26 of which is angular or oblique for a purpose that will hereinafter appear.

The locker or trigger for locking the valve against immediate return movement is designated by angle-lever, and it is in the form of an elbow or L, pivoted at 27 between the lugs or ears 28, extending from the valve-guide G. The working arm of the trigger L is furnished with a catch or hook 29, adapted to engage under the angular offset 25 on the valve-stem when the valve has been raised to its wide-open position, as shown in Fig. 2, the arm 30 of the trigger being weighted to throw the hook under said shoulder when the two parts are in line.

The float for regulating the action of the locker or trigger L and for also tripping the same when the float reaches its lowest position, thereby to release the valve, may be of any suitable construction, it consisting, preferably, of a hollow ball or sphere inclosed in the auxiliary or supplemental tank T', which float when it drops sets a locker tripping or actuating device in operation, the latter serving to lift the weighted arm or gravity-arm 30 on the trigger L and to swing the hook 29 from under the offset or lug 25, thereby releasing the valve V and piston 6, so that the latter can fall to force the valve V against its seat 5, the supply-controlling valve (not shown) having been opened at about this stage.

The lugs 28 on the guide G, to which I have hereinbefore referred, are provided with depending pins 31, fitting in sockets 32 on the inside of the auxiliary tank T' to hold the latter in place on the floor 2 of the main tank.

The float F is secured to the outer end of the bent lever 35, pivoted at 36 between the two lugs 28, which support the trigger L, the working end 36' of the lever being substantially of "cam" shape, so that it can ride along the under face of the weighted arm 30 to raise said arm when the float reaches a point adjacent to the floor or bottom of the tank T', as illustrated by the dotted lines in Fig. 2.

The ascent or upstroke of the float F and its carrying-lever 35 is limited by the stop or pin 37 on one of the lugs 28, against which the free end of the lever impinges when the locker is tripped, as shown by the full lines in Fig. 2.

The auxiliary or supplemental tank T' has in one of its walls a small outlet or port 40, through which a reduced stream from said auxiliary tank can flow when the level of the outflowing water is slighly below said outlet, so that the float F can drop to effect the release of the discharge-valve.

When the tank T has been emptied and the valve V is against its seat 5, the hook 29 of the trigger L will be contiguous to the outer and inclined face 26 of the shoulder 25 and the float F will rest substantially upon the floor of the auxiliary tank T', the locker or trigger, the float, and the float-carrying lever 35 occupying the positions shown by the dotted lines in Fig. 2.

When the supply of water enters the tank T in the usual manner and when it fills the auxiliary tank T' by flowing over the top of the same, the float F will be raised upon the water, so that the lever 35 is moved from its dotted to its full line position in Fig. 2, thereby carrying the working or cam end 36' thereof away from the gravity-arm 30 of the dog L, as shown in Fig. 1, so that said arm can drop.

When the valve V is opened or elevated by raising the stem 6 thereof, the oblique face 26 of the offset 25 will ride in contact with the hook or catch 29 of the trigger and force the same to one side and until the lower end of said offset is in line with or opposite the hook, at which time the gravity-arm 30 will fall to throw said hook under the lug or offset, thereby to prevent the retraction of the valve until the locker L is tripped. When the valve V is raised in the manner just alluded to, the body of water in the tank T can pass very rapidly therefrom to assure the flushing or washing of a water-closet or bowl.

When the main tank T is nearly empty, the contents of the auxiliary tank T' can pass therefrom, so as to allow the float F to drop, and about the time the floor of the tank is reached by the float the end 36' of the lever 35 impinges against and lifts the gravity-arm 30 of the locker or trigger, thereby throwing the hook 29 out of engagement with the lug 25, so that the valve V and its stem 6 can instantly drop to permit the refilling of the tank.

I provide a valve for regulating the emission or quantity of water that issues or emerges from the auxiliary tank T', such means consisting, preferably, of a check valve or gate, as 45, fitting against the face of said tank and having the shank or arm 46 pivoted at 47 thereto. The hand-actuated valve is provided with a finger-piece 48, by which it can be raised or lowered to regulate the size of the outlet 40, and it is held in an adjusted position by a detent or analogous device, as 49, consisting of a strip secured at one end to the auxiliary tank and its other or free end frictionally engaging the face of the valve 45. (Indicated in Fig. 1.)

The support 15 to which the valve-operating lever is fulcrumed is mounted to turn, so that the lever can be disposed at any angle to the tank without affecting the position of the valve mechanism or necessitating any great nicety in mounting the tank. The ring or clamp portion 16, which encircles the head 8 of the guide G, is held in place thereon by the screw 17, as hereinbefore set forth, so that by loosening the latter the lever-support 15 can be turned to any desired extent and held in its adjusted position by tightening the screw. The lever by reason of its described connections with the valve mechanism moves in unison with its support, and its adjustment is accomplished without disturbing the valve.

Having described my invention, I claim—

1. The combination of a main tank; an auxiliary tank supported in the main tank and having sockets, and also having a discharge-outlet; a valve controlling the discharge of the main tank; a guide for the valve, provided with pins fitting in said sockets; and means for operating the valve.

2. The combination, with a main tank, of an auxiliary tank supported in the main tank and having sockets, and also having a discharge-outlet; a valve controlling the discharge of the main tank; a guide for the valve, provided with lugs equipped with pins entering said sockets; a detent supported between said lugs and adapted to engage the valve, and also for operating the detent, and having at one end a float disposed in the auxiliary tank; and means for raising the discharge-controlling valve.

3. The combination, with a main tank, of an auxiliary tank supported in the main tank and having sockets and also having a discharge-outlet; a valve controlling the discharge of the main tank; a guide for the valve, provided with pins fitting in said sockets; a valve-operating lever; and a support for the valve-operating lever, embracing and mounted to turn upon the valve-guide.

4. The combination, with a main tank, of a valve therefor; an auxiliary tank and a valve-guide located in the main tank, one of said parts being provided with a device located to enter a socket in the other part, and the auxiliary tank having a discharge-outlet; and valve-operating means.

5. The combination, with a tank and its discharge-valve, of a guide for the valve, extending through the top of the tank and having a valve-operating lever; a support to which the valve-operating lever is fulcrumed and embracing, and turning on, the valve-guide.

CHARLES G. MILLER.

Witnesses:
F. N. CHASE,
ANDREW FERGUSON.